(12) United States Patent
Harrison

(10) Patent No.: US 9,817,424 B2
(45) Date of Patent: Nov. 14, 2017

(54) METHOD AND APPARATUS FOR MAXIMUM POWER POINT TRACKING FOR MULTI-INPUT POWER CONVERTER

(71) Applicant: Enphase Energy, Inc., Petaluma, CA (US)

(72) Inventor: Michael J. Harrison, Petaluma, CA (US)

(73) Assignee: Enphase Energy, Inc., Pealuma, CA (US)

( * ) Notice: Subject to any disclaimer, the term of this patent is extended or adjusted under 35 U.S.C. 154(b) by 515 days.

(21) Appl. No.: 14/568,911

(22) Filed: Dec. 12, 2014

(65) Prior Publication Data

US 2015/0168980 A1    Jun. 18, 2015

Related U.S. Application Data

(60) Provisional application No. 61/917,672, filed on Dec. 18, 2013.

(51) Int. Cl.
*G05F 1/67* (2006.01)
*H02J 1/10* (2006.01)

(52) U.S. Cl.
CPC ............ *G05F 1/67* (2013.01); *H02J 1/10* (2013.01); *Y10T 307/50* (2015.04)

(58) Field of Classification Search
CPC ................................. H02J 1/10; G05F 1/67
USPC ....................................... 307/43, 75
See application file for complete search history.

(56) References Cited

U.S. PATENT DOCUMENTS

| 6,198,178 B1 | 3/2001 | Schienbein et al. |
| 7,009,859 B2 | 3/2006 | Chen et al. |
| 8,212,409 B2 | 7/2012 | Bettenwort et al. |
| 8,526,205 B2 | 9/2013 | Garrity |
| 2011/0160930 A1 | 6/2011 | Batten et al. |
| 2012/0112550 A1 | 5/2012 | Schill |
| 2012/0161526 A1 | 6/2012 | Huang et al. |
| 2012/0313443 A1 | 12/2012 | Cheng et al. |
| 2013/0002031 A1 | 1/2013 | Mulkey et al. |
| 2013/0043733 A1 | 2/2013 | Frolov et al. |

(Continued)

FOREIGN PATENT DOCUMENTS

| KR | 101135990 B1 | 4/2012 |
| WO | WO-2010147420 A2 | 12/2010 |

OTHER PUBLICATIONS

Ahn et al., "Dual-Module Based Maximum Power Point Tracking Control of PV System", IEEE, 6 Pages, 2004.

(Continued)

*Primary Examiner* — Adi Amrany
(74) *Attorney, Agent, or Firm* — Moser Taboada

(57) ABSTRACT

A method and apparatus for maximum power point tracking (MPPT). In one embodiment, the method comprises (i) modulating an operating voltage of a first DC source by a first perturbation function to generate a first output power; (ii) modulating an operating voltage of a second DC source by a second perturbation function to generate a second output power, wherein the first and the second perturbation functions are synchronized with one another and out of phase with one another; (iii) comparing the first and the second output powers; and (iv) adjusting MPPT set points for both the first and the second DC sources in the same direction based on a result of comparing the first and the second output powers.

20 Claims, 3 Drawing Sheets

(56) References Cited

U.S. PATENT DOCUMENTS

2013/0163137 A1   6/2013   Johnston et al.
2014/0062500 A1   3/2014   Behrends et al.

OTHER PUBLICATIONS

Grandi et al., "Dual-Array Based MPPT for Grid-Connected Photovoltaic Systems", Electronics, vol. 14, Issue 1, pp. 108-112, Jun. 2010.
Sivakumar et al., "Control of Hybrid System Using Multi-Input Inverter and Maximum Power Point Tracking", International Journal of Engineering Research and Applications, vol. 3, Issue 4, pp. 77-81, Jul.-Aug. 2013.
Shen et al., "Multi-Input Converter with MPPT Feature for Wind-PV Power Generation System", International Journal of Photoenergy, 13 pages, 2013.
International Search Report and Written Opinion dated Mar. 31, 2015 for PCT Application No. PCT/US2014/070274.

METHOD AND APPARATUS FOR MAXIMUM POWER POINT TRACKING FOR MULTI-INPUT POWER CONVERTER

CROSS-REFERENCE TO RELATED APPLICATION

This application claims priority to U.S. Provisional Patent Application No. 61/917,672 filed on Dec. 18, 2013, which is herein incorporated in its entirety by reference.

BACKGROUND OF THE INVENTION

Field of the Invention

Embodiments of the present disclosure relate generally to power conversion, and, in particular, to maximum power point tracking for a multi-input power converter.

Description of the Related Art

Distributed power generators typically comprise a power source that generates direct current (DC) power, a power converter, and a controller. The power source may be a one or more of a photovoltaic (PV) module, a wind turbine, a hydroelectric generator, fuel cell, or the like. The power converter converts DC power from the power source into DC or AC power, which may be coupled directly to a power distribution system.

PV modules have a nonlinear relationship between the current (I) and voltage (V) that they produce. A maximum power point (MPP) on an I-V curve for a PV module identifies the optimal operating point of the PV module; when operating at this point, the PV module generates the maximum possible output power for a given temperature and solar irradiance. In order to optimize power drawn from a PV module, a power converter coupled to the PV module generally employs a maximum power point tracking (MPPT) technique to ensure that the PV module is operated at the current and voltage levels corresponding to its MPP. For optimal efficiency, it is important that the MPPT acts to rapidly adjust the operating current and voltage levels to achieve the MPP for each power source coupled to a power converter.

Therefore, there is a need in the art for a method and apparatus for efficiently operating multiple power converter power sources at their maximum power points.

SUMMARY OF THE INVENTION

Embodiments of the present invention generally relate to a method and apparatus for maximum power point tracking for multi-input power converters substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
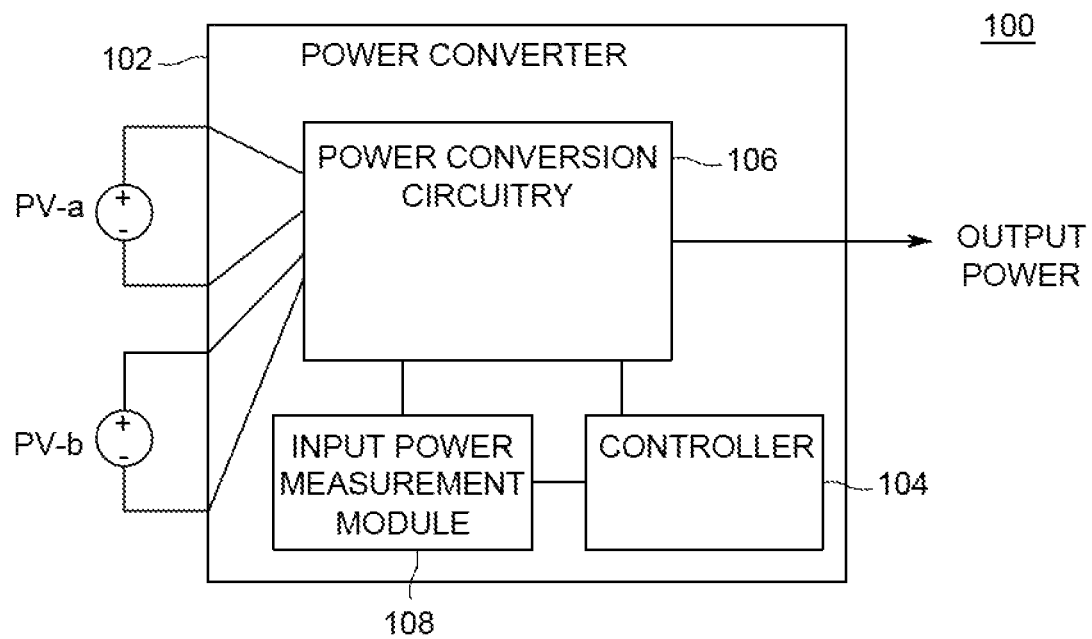
FIG. 1 is a block diagram of a power conversion system in accordance with one or more embodiments of the present invention.

FIG. 1 is a block diagram of a power conversion system 100 in accordance with one or more embodiments of the present invention. This diagram only portrays one variation of the myriad of possible system configurations. The present invention can function in a variety of power generation environments and systems.

The power conversion system 100 comprises photovoltaic (PV) modules PVa and PVb, each coupled to a dual-input power converter 102. The PV modules PVa and PVb may be coupled either in series or in parallel to the power converter 102 such that the output from each PV module is independently coupled to the power converter 102 for power processing (i.e., the power from each PV module is processed independently from the other PV module). The PV modules PVa and PVb are co-located, for example PVa and PVb are installed on the same building rooftop, and as such the level of irradiance on each of the PV modules is generally correlated (i.e., increases or decreases at the same time).

The power converter 102, which may be a DC-DC power converter or a DC-AC inverter (e.g., a single-phase, two-phase or split-phase, or a three-phase DC-AC inverter), comprises power conversion circuitry 106 coupled to each of an input power measurement module 108 and a controller 104 which controls operation of the power converter 102. The power conversion circuitry 106 is further coupled to the PV modules PVa and PVb for receiving a DC input from each PV module and generating the output power from the power converter 102. The input power measurement module 108 is coupled to the power conversion circuitry for measuring the input power from each of the PV modules PVa and PVb; the input power measurement module 108 is further coupled to the controller 104 and provides the power measurements to the controller 104. In those embodiments where the power converter 102 is a DC-AC inverter, the generated AC output power may be coupled to an AC line, such as a commercial AC power grid.

In accordance with embodiments of the present invention, the controller 104 employs a multi-input maximum power point tracking (MPPT) technique for operating each of the PV modules PVa and PVb proximate it's MPP. In order to maintain individual MPP tracking of the independent PV module inputs, the controller 104 uses a perturb and observe (P&O) technique to drive each PV module PVa and PVb independently toward its MPP. The individual MPPT algorithms operating with respect to the PV modules PVa and PVb independently adjust their respective MPPT set points (i.e., the desired DC operating voltage for the corresponding PV module) up or down based on the difference in output power between sequential perturbations for the corresponding PV module.

In addition to the independent MPPT for each of the PV modules PVa and PVb, the MPPT set points for both of the PV modules PVa and PVb are adjusted up or down based on the power generated by the PV modules PVa and PVb during simultaneous perturbation periods. In order to determine this correlated MPPT set point direction, the MPPT perturbations for the PV modules PVa and PVb are arranged to drive in opposite directions (synchronized but out of phase) and the resulting power output from the PV modules PVa and PVb during simultaneous perturbation periods is compared. A decision is then made to either increase or decrease the pair of MPPT set points based on this single bifurcated perturbation—i.e., the MPPT set point for each of the PV modules PVa and PVb is moved in the direction that creates the greater improvement in power output from the pair of PV modules PVa and PVb. The bifurcated perturbation would be performed at a low enough frequency as to not interfere with the main MPPT perturbation. Generally, the frequencies of independent control loops should be an order of magnitude apart (e.g., ×10) in order to be considered independent. In some embodiments where the power converter 102 is coupled to the AC power grid and the main MPPT perturbation is performed at the grid frequency, the bifurcated perturbation is performed at one tenth of the grid frequency.

Thus, the two independent P&O MPPT algorithms are configured so that their perturbations are synchronized but kept out of phase (i.e., one increases and the other decreases). Cross-coupling the power harness comparisons between this pair of MPPT algorithms allows the overall performance of the pair of MPPT algorithms to be improved based on the natural correlation that exists between the irradiance that would fall on the co-located PV modules PVa and PVb.

In some embodiments, the power converter 102 is a single-phase DC-AC inverter that generates a single-phase AC output. In one or more of such embodiments, the P&O perturbation for one of the PV modules (e.g., the PV module PVa) is provided by a natural AC voltage ripple across the DC input of the power converter 102 (e.g., the ripple across one or more DC input capacitors of the power converter 102), and the P&O perturbation for the second PV module (e.g., the PV module PVb) is generated accordingly (i.e., synchronized and out of phase with respect to the first P&O perturbation). In other single-phase embodiments, other types of perturbation functions may be used.

In some other embodiments, the power converter 102 is a three-phase DC-AC inverter that generates a three-phase AC output. Analogous to the single-phase embodiment, perturbation modulation functions pertaining to each of the PV modules PVa and PVb are synchronized but out of phase. In one or more of the three-phase embodiments, the perturbation modulation functions for the PV modules are chosen such that the total sum power for the two perturbated inputs sums to a constant; as such, constant non-fluctuating power is delivered to the AC output (e.g., the AC mains). Any suitable perturbation functions where the interleaved functions add up to a constant power transfer may be used, for example simple mathematical functions such as sinewave, triangular wave, squarewave, or the like. The normal requirement for any perturbation function would be that the perturbation amplitude would be small compared to the DC offset—to achieve this result a small perturbation function is added to a larger DC offset to create a raised-sinewave, raised-triangular wave, raised-square wave perturbation function, or the like.

Although two PV modules are depicted in FIG. 1, in other embodiments any number of additional PV modules may be included. For embodiments where the number of PV modules is greater than two, the perturbations are arranged so that the total power perturbation is zero. For example, in an embodiment where there are three PV modules coupled to the power converter 102, if a sinewave perturbation function is used then all three perturbation signals must be of the same frequency and amplitude and phase-shifted from one another such that each of the three perturbation functions would be exactly 120 electrical degrees apart from the other two perturbation functions (i.e., the three unique perturbation functions have a net zero impact on the total power perturbation).

In some alternative embodiments, other types of DC power sources that can be operated at a maximum power point may be used in place of one or both of the PV modules PVa and PVb.

Figure 2:
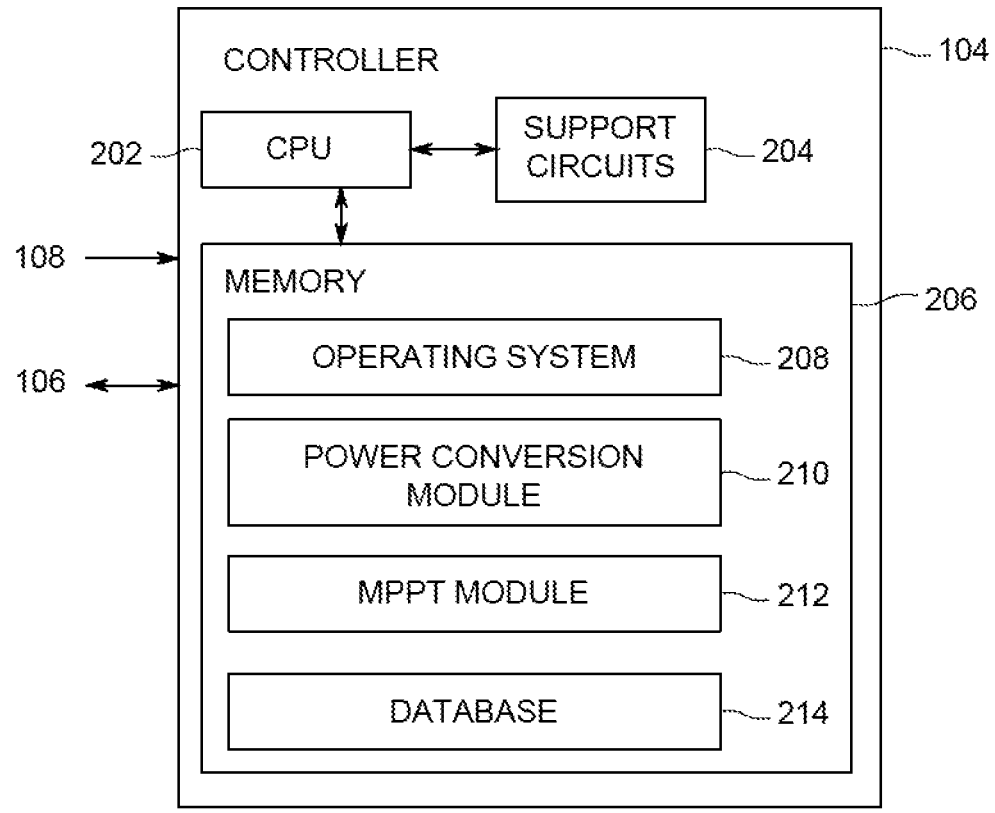
FIG. 2 is a block diagram of a controller in accordance with one or more embodiments of the present invention.

FIG. 2 is a block diagram of a controller 104 in accordance with one or more embodiments of the present invention. The controller 104 comprises a CPU 202 coupled to each of support circuits 204 and a memory 206. The CPU 202 may comprise one or more conventionally available microprocessors or microcontrollers; alternatively, the CPU 202 may include one or more application specific integrated circuits (ASICs). The support circuits 204 are well-known circuits used to promote functionality of the CPU 202. Such circuits include, but are not limited to, a cache, power supplies, clock circuits, buses, input/output (I/O) circuits, and the like. The controller 104 may be implemented using a general purpose computer that, when executing particular software, becomes a specific purpose computer for performing various embodiments of the present invention.

The memory 206 may comprise random access memory, read only memory, removable disk memory, flash memory, and various combinations of these types of memory. The memory 206 is sometimes referred to as main memory and may, in part, be used as cache memory or buffer memory. The memory 206 generally stores the operating system (OS) 208, if necessary, of the controller 104 that can be supported by the CPU capabilities. In some embodiments, the OS 208 may be one of a number of commercially available operating systems such as, but not limited to, LINUX, Real-Time Operating System (RTOS), and the like.

The memory 206 may store various forms of application software, such as a power conversion module 210 for controlling various aspects of power conversion by the power converter 102 (including controlling the power conversion circuitry 106). The memory 206 further stores an MPPT module 212 for implementing the MPPT functions described herein. In some embodiments, the MPPT module 212 may be part of the power conversion module 210, or may be two (or more) separate modules (e.g., a different MPPT module for each PV module coupled to the power converter 102). The memory 206 additionally may store a database 214 for storing data related to power conversion and/or the present invention, such as one or more perturbation functions.

Figure 3:
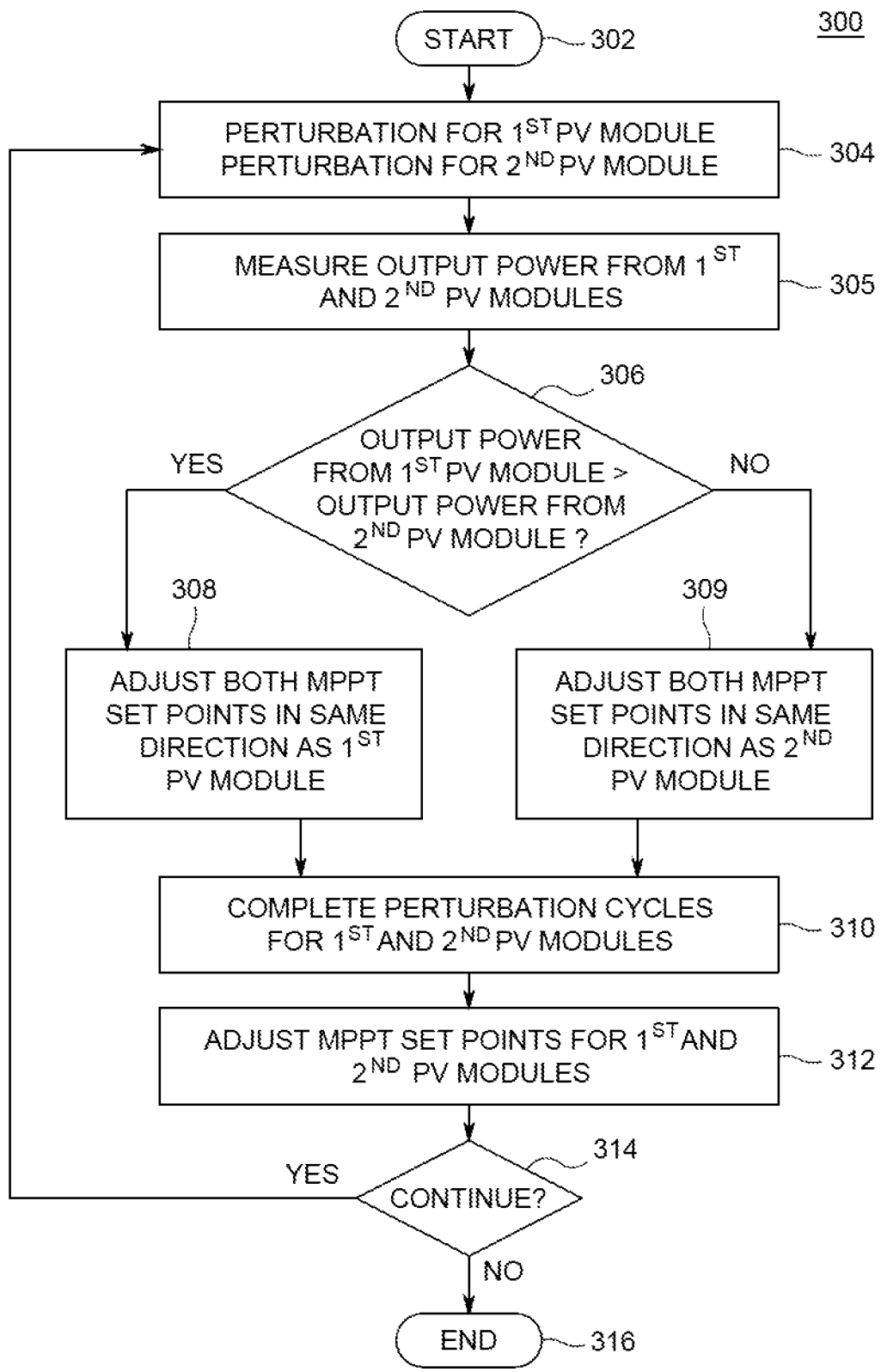
FIG. 3 is a flow diagram of a method for maximum power point tracking in accordance with one or more embodiments of the present invention.

FIG. 3 is a flow diagram of a method 300 for multi-input maximum power point tracking in accordance with one or more embodiments of the present invention. The method 300 may be employed by a multi-input power converter such as the power converter 102. In some embodiments of the method 300, such as the embodiment described below, the power converter is coupled to two PV modules (such as the two PV modules PVa and PVb) and generates a single-phase AC output, while in other embodiments the power converter generates a three-phase AC output. In one or more embodiments, other types of DC inputs that can be operated at a maximum power point may be coupled to the power converter. In some embodiments, more than two input sources are coupled to the power converter.

The method 300 starts at step 302 and proceeds to step 304. At step 304, a perturb and observe (P&O) technique is employed to independently drive each PV module toward its MPP, and the first PV module operating voltage is perturbed based on a first perturbation function while the second PV module operating voltage is perturbed based on a second perturbation function. The first and second MPPT perturbation functions are arranged to drive in opposite directions (i.e., the perturbations are synchronized and out of phase with one another). In some embodiments, the perturbation for one of the PV modules is given by a natural AC voltage ripple across the DC input of the power converter and the perturbation for the second PV module is generated such that it is synchronized and out of phase with the first perturbation. In other embodiments where the power converter generates a three-phase AC output, the perturbation modulation functions for the PV modules are chosen such that the total sum power for the two perturbated inputs sums to a constant as previously described.

At step 305, the output power generated by each of the PV modules as a result of their simultaneous perturbations is measured (i.e., integrated). In some embodiments where the power converter is coupled to an AC grid, the power would be integrated over a complete grid cycle period. At step 306, the output power from the PV modules is compared and a decision is made whether the output power from the first PV module is greater than the output power from the second PV module in order to either increase or decrease the pair of MPPT set points based on the single bifurcated perturbation—i.e., the MPPT set points are to be moved in the direction that creates the greater improvement in power out of the pair of PV modules. If the result of the decision at step 306 is yes, that the first PV module output power was greater, the method 300 proceeds to step 308 where the set points for both PV modules are adjusted in the same direction as the previous set point adjustment for the first PV module. If the result of the decision at step 306 is no, that the first PV module output power was not greater, the method 300 proceeds to step 309 where the set points for both PV modules are adjusted in the same direction as the previous set point adjustment for the second PV module. The method 300 proceeds from both steps 308 and 309 to step 310.

At step 310, the individual perturbation cycles for each of the PV modules are completed. For each PV module, the power generated over the first and second halves of the perturbation cycle is compared and a decision is made independently for each PV module whether to increase or decrease its MPPT set point. At step 312 the MPPT set points for the PV modules are independently adjusted based on the decision made at step 310.

At step 314, a decision is made whether to continue operating. If the result of the decision is yes, the method 300 returns to step 304; if the result of the decision is no, the method 300 proceeds to step 316 where it ends.

In some alternative embodiments of the method 300, the power converter generates a three-phase output and is coupled to more than two DC inputs. In such embodiments, a perturbation technique analogous to the technique described above is performed where the perturbation functions for the PV modules are determined as previously described for three-phase embodiments. In certain embodiments, more than two PV modules may be coupled to the power converter and a perturbation technique analogous to the technique described above it performed where the perturbations are arranged so that the total power perturbation is zero as previously described.

Examples of systems in which the techniques described herein may be used can be found in commonly assigned U.S. patent application Ser. No. 14/140,221, titled "Three Port Converter with Dual Independent Maximum Power Point Tracking" and filed Dec. 24, 2013; commonly assigned U.S. patent application Ser. No. 14/505,299, titled "Method and Apparatus for Independent Control of Multiple Power Converter Sources" and filed Oct. 2, 2014; and commonly assigned U.S. patent application Ser. No. 14/505,725, titled "Arc Fault Protection for Power Conversion" and filed Oct. 3, 2014, each of which is herein incorporated in its entirety by reference.

Figure 4:
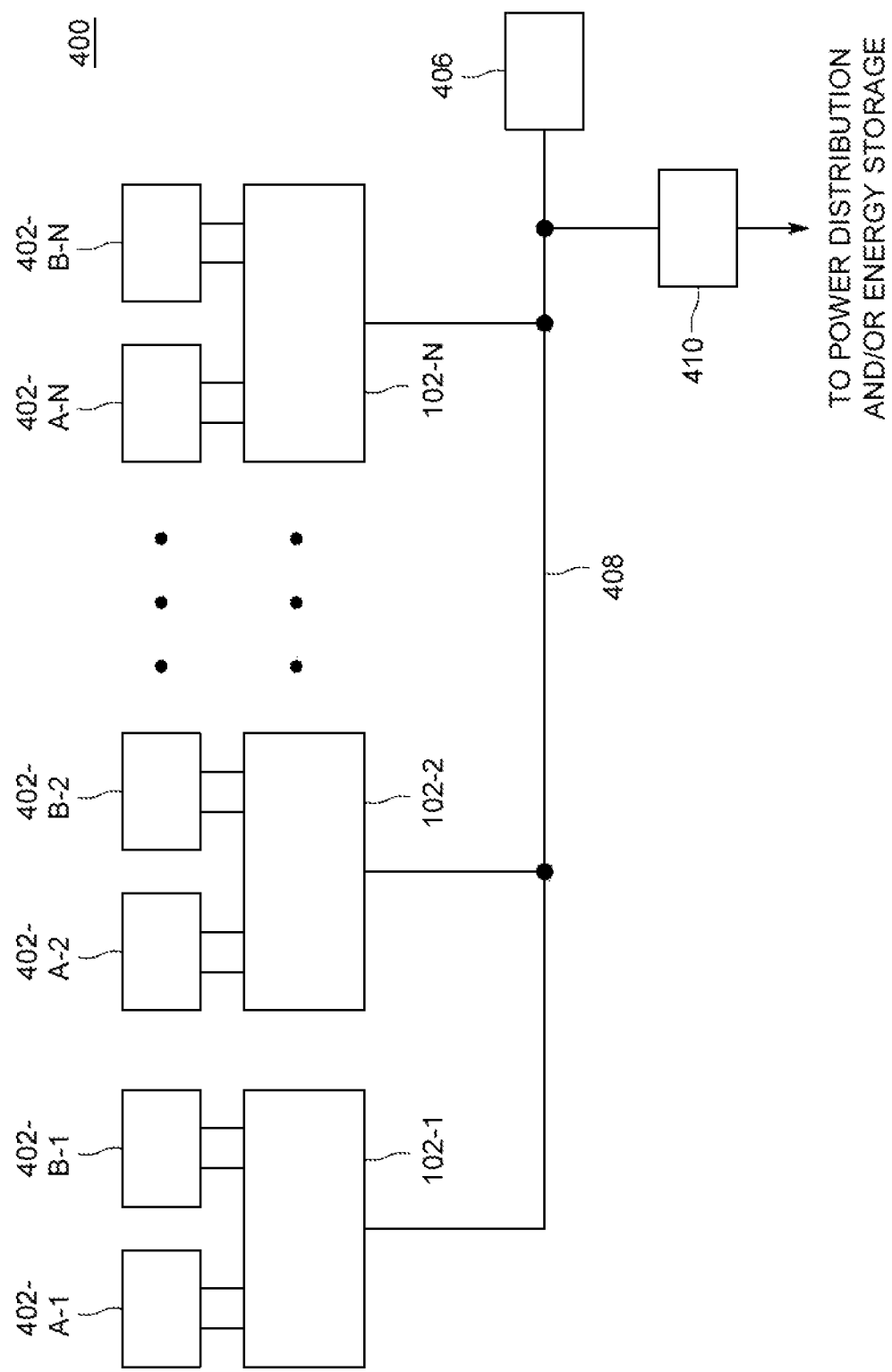
FIG. 4 is a block diagram of a power conversion system in accordance with one or more embodiments of the present invention.

FIG. 4 is a block diagram of a power conversion system 400 in accordance with one or more embodiments of the present invention. This diagram only portrays one variation of the myriad of possible system configurations and devices that may utilize the present invention for multi-input maximum power point tracking (MPPT).

The system 400 comprises a plurality of power converters 102-1, 102-2 . . . 102-N, collectively referred to as power converters 102. Each power converter 102 is coupled to two DC sources 402-A and 402-B; i.e., the power converter 102-1 is coupled to the DC sources 402-A-1 and 402-B-1, the power converter 102-2 is coupled to the DC sources 402-A-2 and 402-B-2, and the power converter 102-N is coupled to the DC sources 402-A-N and 402-B-N. The DC sources 402-A and 402-B are any suitable DC power sources that each have an operating maximum power point (MPP) and can be driven to operate at or near its MPP. In some embodiments, the DC sources 402-A and 402-B are photovoltaic (PV) modules; in other embodiments the DC sources 402-A and 402-B may be other types or renewable energy sources (e.g., a wind turbine, a hydroelectric system, or the like).

The power converters 102 are further coupled to a system controller 406 via a bus 408, and a load center 410 is also coupled to the bus 408. The system controller 406 is capable of communicating with the power converters 102 by wireless and/or wired communication (e.g., power line communications) for providing operative control of the power converters 102 and/or receiving data from the power converters 102. In some embodiments, the system controller 406 may be a gateway that receives data from the power converters 102 and communicates the data to another system, e.g., via the Internet.

In some embodiments, the power converters 102 are DC-AC inverters that each convert the received DC power to AC power (single-phase, two-phase or split-phase, or three-phase AC power), although in other embodiments the power converters 102 may be other types of power converters such as DC-DC converters. The power converters 102 couple the generated output power to the load center 410 via the bus 408. The generated power may then be distributed for use, for example to one or more appliances, and/or the generated energy may be stored for later use, for example using batteries, heated water, hydro pumping, $H_2O$-to-hydrogen conversion, or the like. In some embodiments, the power converters 102 convert the DC input power to AC power that is commercial power grid compliant and couple the AC power to the commercial power grid via the load center 410.

In accordance with embodiments of the present invention, each of the power converters 102 employs a multi-input maximum power point tracking (MPPT) technique for operating each of the corresponding DC sources 402-A and 402-B at or near its MPP, as previously described. In some alternative embodiments, one or more of the power converters 102 may be coupled to additional DC sources; in such embodiments, the power converters 102 having more than two DC input sources employ the multi-input MPPT technique where the perturbations are arranged such that the total power perturbation is zero.

The foregoing description of embodiments of the invention comprises a number of elements, devices, circuits and/or assemblies that perform various functions as described. These elements, devices, circuits, and/or assemblies are exemplary implementations of means for performing their respectively described functions.

While the foregoing is directed to embodiments of the present invention, other and further embodiments of the invention may be devised without departing from the basic scope thereof, and the scope thereof is defined by the claims that follow.

The invention claimed is:

1. A method for maximum power point tracking (MPPT), comprising:
    modulating an operating voltage of a first DC source by a first perturbation function to generate a first output power;
    modulating an operating voltage of a second DC source by a second perturbation function to generate a second output power, wherein the first and the second perturbation functions are synchronized with one another and out of phase with one another;
    comparing the first and the second output powers; and
    adjusting MPPT set points for both the first and the second DC sources in the same direction based on a result of comparing the first and the second output powers.

2. The method of claim 1, wherein first and second perturb and observe (P&O) MPPT techniques are employed for independently driving the first and the second DC sources, respectively, toward their respective maximum power points.

3. The method of claim 1, wherein the first and the second DC sources are coupled to a single power converter.

4. The method of claim 3, wherein the power converter is a DC-AC inverter.

5. The method of claim 4, wherein the DC-AC inverter generates a single-phase AC output.

6. The method of claim 5, wherein the first perturbation function is an AC voltage ripple across the first DC source.

7. The method of claim 4, wherein the DC-AC inverter generates a three-phase AC output.

8. The method of claim 7, wherein the first and the second perturbation functions are such that a total sum power of the perturbated operating voltage of the first DC source and the perturbated operating voltage of the second DC source sums to a constant.

9. An apparatus for maximum power point tracking (MPPT), comprising:
    a power converter, coupled to a first DC source and a second DC source, comprising an MPPT module for:
        employing a first perturb and observe (P&O) MPPT technique for driving the first DC source toward its maximum power point (MPP), wherein an operating voltage of the first DC source is modulated by a first perturbation function to generate a first DC source output power based on the first P&O MPPT technique;
        employing a second P&O MPPT technique for driving the second DC source toward its MPP, wherein an operating voltage of the second DC source is modulated by a second perturbation function to generate a second DC source output power based on the second P&O MPPT technique, and wherein the first and the second perturbation functions are synchronized with one another and out of phase with one another;
        comparing the first and the second DC source output powers; and
        adjusting MPPT set points for both the first DC source and the second DC source in the same direction based on a result of comparing the first and the second DC source output powers.

10. The apparatus of claim 9, wherein the first and the second P&O MPPT techniques independently drive the first and the second DC sources, respectively, toward their respective maximum power points.

11. The apparatus of claim 9, wherein the power converter is a DC-AC inverter.

12. The apparatus of claim 11, wherein the DC-AC inverter generates a single-phase AC output.

13. The apparatus of claim 12, wherein the first perturbation function is an AC voltage ripple across the first DC source.

14. The apparatus of claim 11, wherein the DC-AC inverter generates a three-phase AC output.

15. The apparatus of claim 14, wherein the first and the second perturbation functions are such that a total sum power of the perturbated operating voltage of the first DC source and the perturbated operating voltage of the second DC source sums to a constant.

16. A system for maximum power point tracking (MPPT), comprising:
    a first DC source;
    a second DC source; and
    a power converter, coupled to the first and the second DC sources, comprising an MPPT module for:
        employing a first perturb and observe (P&O) MPPT technique for driving the first DC source toward its maximum power point (MPP), wherein an operating voltage of the first DC source is modulated by a first perturbation function to generate a first DC source output power based on the first P&O MPPT technique;
        employing a second P&O MPPT technique for driving the second DC source toward its MPP, wherein an operating voltage of the second DC source is modulated by a second perturbation function to generate a second DC source output power based on the second P&O MPPT technique, and wherein the first and the second perturbation functions are synchronized with one another and out of phase with one another;
        comparing the first and the second DC source output powers; and
        adjusting MPPT set points for both the first DC source and the second DC source in the same direction based on a result of comparing the first and the second DC source output powers.

17. The system of claim 16, wherein the first and the second P&O MPPT techniques independently drive the first and the second DC sources, respectively, toward their respective maximum power points.

18. The system of claim 16, wherein the power converter is a DC-AC inverter that generates a single-phase AC output.

19. The system of claim 18, wherein the first perturbation function is an AC voltage ripple across the first DC source.

20. The system of claim 16, wherein the power converter is a DC-AC inverter that generates a three-phase AC output, and, wherein the first and the second perturbation functions are such that a total sum power of the perturbated operating voltage of the first DC source and the perturbated operating voltage of the second DC source sums to a constant.

\* \* \* \* \*